(12) United States Patent
Jeory

(10) Patent No.: US 6,234,450 B1
(45) Date of Patent: May 22, 2001

(54) CONNECTORS AND VALVES

(76) Inventor: James Jeory, Mayo House, 12 Kingsway, Preston PR1 OAP (GB)

( * ) Notice: Subject to any disclaimer, the term of this patent is extended or adjusted under 35 U.S.C. 154(b) by 0 days.

(21) Appl. No.: 09/478,347

(22) Filed: Jan. 6, 2000

(30) Foreign Application Priority Data

Jan. 8, 1999 (GB) .................................................. 9900276

(51) Int. Cl.[7] .............................. F16K 51/00; F16L 29/02
(52) U.S. Cl. ........................ 251/149.6; 251/323; 251/339; 137/223; 137/228
(58) Field of Search .................... 137/223, 228; 251/149.6, 232, 339

(56) References Cited

U.S. PATENT DOCUMENTS

| 4,171,119 | 10/1979 | Lamson . |
| 4,917,353 | * 4/1990 | Riley ................................. 251/149.6 |
| 5,082,244 | 1/1992 | Krier et al. . |

FOREIGN PATENT DOCUMENTS

| 0270302 | 6/1988 | (EP) . |
| 1245822 | 9/1971 | (GB) . |
| 1350254 | 4/1974 | (GB) . |
| 2204836 | 11/1988 | (GB) . |

* cited by examiner

Primary Examiner—Michael Buiz
Assistant Examiner—Ramesh Krishnamurthy
(74) Attorney, Agent, or Firm—Williams, Morgan & Amerson, P.C.

(57) ABSTRACT

To avoid sealing problems associated with attachment of a connector to a separate valve member when providing for evacuation of a bag or other container, a unitary connector and valve (10) comprises a spring-loaded valve member (24) located in a bore (20) in a housing (12), which has external clamping (40–46) enabling the housing (12) to be sealingly attached to a container (not shown) as well as a fitting (48) enabling the housing (12) to be attached to an air line (not shown).

6 Claims, 1 Drawing Sheet

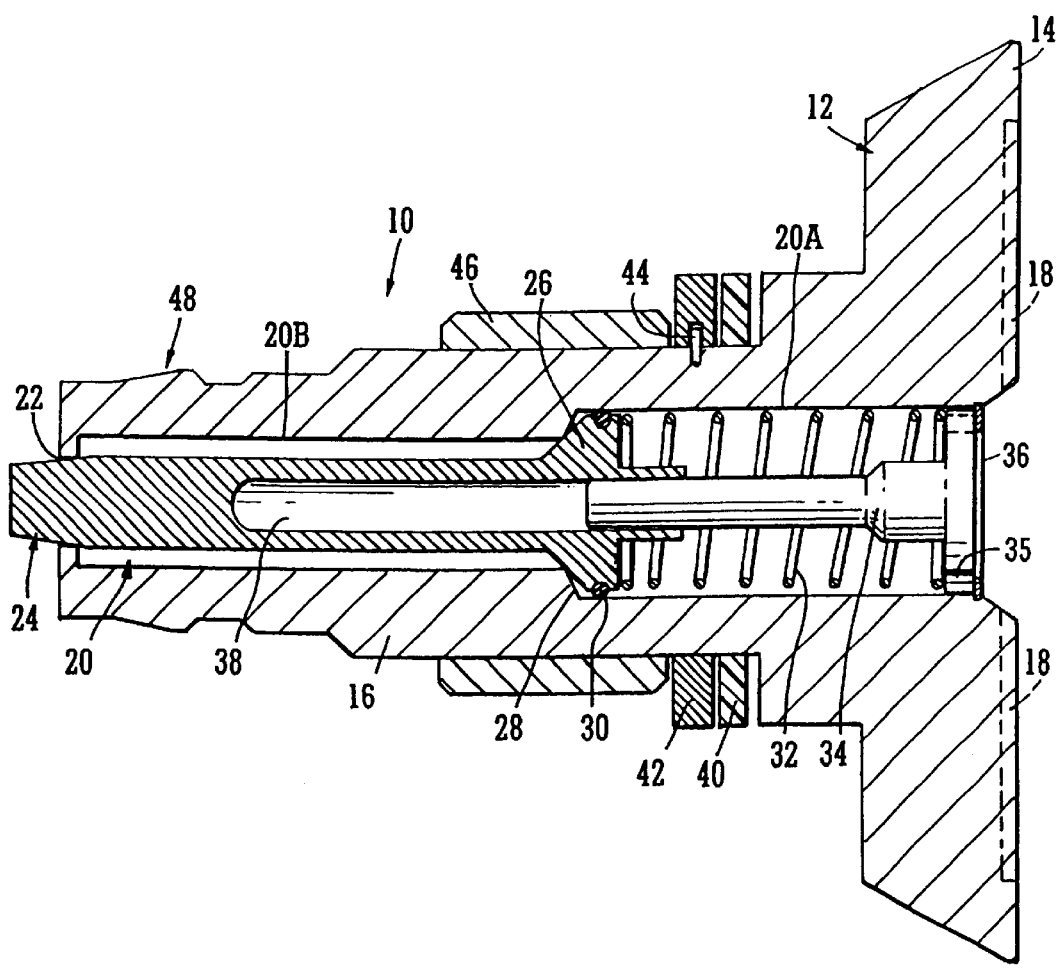

CONNECTORS AND VALVES

The present invention relates to a combined connector and valve which can be used in the evacuation of air from a closed space. In particular the invention is related to manufacturing processes which are conducted in vacuum e.g in the manufacture of fibre reinforced composites, in which a vacuum bag is used.

In use the vacuum bag has to be evacuated and therefore means are required in order to connect an air line to the vacuum bag in order to evacuate the bag and also to prevent air from re-entering the bag after the vacuum has been created.

Hitherto these means have been in the form of a separate connector and valve in which the valve is attached to the connector by a screw thread which is sealed or partially sealed by means of a suitable material in tape form. The valve is of a non-return type and can be automatically opened when the valve is attached to an air line, the air line being attached to the valve body by means of a standard snap fitting.

The present invention seeks to provide a combined connector and valve which avoids the need for a screw threaded connection between the connector and the valve body thereby eliminating a source of leakage.

Accordingly the present invention provides a unitary connector and valve arranged to be connectable to a container to be evacuated, the connector including a housing, a spring loaded valve member located in a bore in the housing, the housing having clamping means enabling the housing to be sealingly attached to a container to be evacuated, and connecting means enabling an air line to be attached to the housing.

The valve member can be retained in the housing by means of a shoulder on the valve member contacting a shoulder of the bore in the housing.

The valve member can include a sealing member in contact with the bore in the housing.

The connector can include a guide member located and secured in the bore of the housing.

The guide member can extend into a bore in the valve member.

The connector can include a spring located between the guide member and the valve member.

The guide member can be secured in position by means of a cir-clip.

The present invention will now be more particularly described with reference to the accompanying drawing which shows a sectional elevation of one form of unitary connector and valve according to the present invention.

Referring to the drawing there is shown a unitary connector and valve (10) comprising a housing (12) having a base (14) and a stem (16). The base (14) is formed with four radially extending slots (18) and the body (12) is formed with a bore (20) which has a lower larger diameter length (20a) and an upper smaller diameter length (20b). The upper end of the housing (12) is provided with an aperture (22) which is smaller in diameter than the bore of the length (20b).

A valve member (24) is located within the bore (20) and has a shoulder (26) which bears against a shoulder (28) formed between the bores (20a) and (20b) and the upper end of the valve member (24) is formed as a frusto-cone which contacts the rim of the aperture (22). The valve member (24) is provided with an O-ring seal (30) which is in contact with the bore (20a) and a spring (32) urges the valve member into the position shown in the figure.

A guide member (34) is held in a stationary position in the bore (20a) by means of a cir-clip (36) and the guide member (34) extends into an internal bore (38) in the valve member (24).

The guide member (34) has three equi-spaced openings (35) in the base to allow air to enter into the bore (20) in the housing (12).

A silicone rubber washer (40) is slidably mounted on the housing as is a sealing disc (42). The sealing disc (42) is prevented from rotating by means of a radially extending pin (44) which extends into a slot cut into the sealing disc.

A retaining nut (46) is mounted on a screw thread on the housing (12) and the housing (12) is formed externally with a fitting (48) of a standard type enabling an air line to be connected to the housing (12).

In use one or more connectors (10) are attached to a vacuum bag with the bag secured between the washer (40) and the sealing disc (42). The retaining nut (46) is then turned so that the vacuum bag is sealingly clamped between the washer (40) and the sealing disc (42).

It will be appreciated that as the sealing disc is prevented from rotation by means of the pin (44) no scuffing takes place between the sealing disc and the vacuum bag.

An air line can then be connected to the housing (12) using the standard snap fitting (48) and as will be appreciated when the air line is so attached the valve member (24) is depressed against the force of the spring (32) thereby displacing the valve member (24) so that the shoulders (26) and (28) do not contact one another. The air in the bag can then be evacuated through the air line until the desired vacuum has been achieved. Upon release of the air line from the connector (12) the valve member will automatically assume the position shown in the drawing thereby preventing air from re-entering the vacuum bag.

It will be appreciated that the guide member (34) ensures that the valve member is always centred and can not jam when the valve member is operated either to open or close the valve.

It will also be appreciated that as the connector and valve member are integrated into a single housing there is no connection which requires sealing between the connector and the valve as has been the practice in the past. This removes a potential source of leakage.

It will be further appreciated that as the guide member is held in place by the cir-clip (36) the guide member (34) and the valve member (24) can be readily removed from the housing (12) enabling the O-ring seal (30) to be easily replaced. In contrast, in the presently used separate valve, the corresponding valve member cannot be readily removed and replaced.

What is claimed is:

1. A unitary connector and valve device which is adapted to be connectable to a container to be evacuated, the device comprising:
   a housing having a bore therein,
   a spring loaded valve member located in said bore,
   a guide member located and held in a stationary position in the bore of the housing, said guide member being associated with the valve member;
   clamping means provided on the housing to be sealingly attached to a container to be evacuated, and
   connecting means also provided on the housing to enable an air line to be attached to the housing.

2. A device as set forth in claim 1 in which the valve member is retained in the housing by means of a shoulder on the valve member contacting a shoulder of the bore in the housing.

3. A device as set forth in claim 2 in which the valve member includes a sealing member in contact with the bore in the housing.

4. A device as set forth in claim 1 in which the valve member has a bore formed therein and the guide member extends into said valve member bore.

5. A device as set forth in claim 1 in which a spring is located between the guide member and the valve member.

6. A device as set forth in claim 1 in which the guide member is secured in position by a cir-clip.

* * * * *